United States Patent
Lee et al.

(10) Patent No.: US 8,495,282 B2
(45) Date of Patent: *Jul. 23, 2013

(54) FLASH-AWARE STORAGE OPTIMIZED FOR MOBILE AND EMBEDDED DBMS ON NAND FLASH MEMORY

(75) Inventors: SangCheol Lee, Seoul (KR); BongSoo Ko, Seoul (KR); HyungGook Yoo, Seoul (KR); SongHee Kang, Seoul (KR)

(73) Assignee: Oracle International Corporation, Redwood Shores, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/945,106

(22) Filed: Nov. 12, 2010

(65) Prior Publication Data

US 2011/0167200 A1  Jul. 7, 2011

Related U.S. Application Data

(63) Continuation of application No. 11/749,383, filed on May 16, 2007, now Pat. No. 7,856,522.

(51) Int. Cl.
 *G06F 12/00* (2006.01)
(52) U.S. Cl.
 USPC ............ 711/103; 711/E12.009; 711/E12.016; 711/E12.054; 711/118; 711/203; 711/159
(58) Field of Classification Search
 USPC ........................................................ 711/103
 See application file for complete search history.

(56) References Cited

U.S. PATENT DOCUMENTS

| | | | |
|---|---|---|---|
| 5,943,692 A * | 8/1999 | Marberg et al. | 711/203 |
| 6,810,472 B2 * | 10/2004 | Venkatraman | 711/207 |
| 6,957,314 B2 | 10/2005 | Beckert et al. | |
| 7,120,773 B2 | 10/2006 | Yoshioka et al. | |
| 7,516,266 B2 | 4/2009 | Fu | |
| 7,856,522 B2 | 12/2010 | Lee | |
| 2007/0294494 A1 * | 12/2007 | Conti et al. | 711/158 |
| 2008/0288713 A1 | 11/2008 | Lee | |

OTHER PUBLICATIONS

U.S. Appl. No. 11/749,383, filed May 16, 2007 Office Action mailed Aug. 27, 2009, 16 pages.
U.S. Appl. No. 11/749,383, filed May 16, 2007 Office Action mailed Mar. 10, 2010, 16 pages.
U.S. Appl. No. 11/749,383, filed May 16, 2007 Notice of Allowance mailed Aug. 12, 2010, 11 pages.

* cited by examiner

*Primary Examiner* — Reginald Bragdon
*Assistant Examiner* — Hamdy S Ahmed
(74) *Attorney, Agent, or Firm* — Kilpatrick Townsend & Stockton LLP

(57) ABSTRACT

Reliable storage for database management systems (DBMS) running on memory devices such as NAND type flash memory utilizes minimum I/O overhead and provides maximum data durability. A virtual page map is utilized between the flash memory and a page access component to record changes to the DBMS pages and prevent overwriting or data loss. There is no need for journaling and logging, and performance is increased by reducing the write and erase counts on the flash memory. The logical page numbers of the DBMS are mapped to physical page numbers in the page map, such that the virtual page map allocates an available page from the physical pages when changes to a page occur, and the updated information is stored in the allocated page. The allocated page number is mapped to the logical page number of the original page, thus maintaining a modified page representation while preventing physical in-place updates.

20 Claims, 7 Drawing Sheets

FLASH-AWARE STORAGE OPTIMIZED FOR MOBILE AND EMBEDDED DBMS ON NAND FLASH MEMORY

This application is a continuation of U.S. patent application Ser. No. 11/749,383, entitled "FLASH-AWARE STORAGE OPTIMIZED FOR MOBILE AND EMBEDDED DBMS ON NAND FLASH MEMORY", filed May 16, 2007, now U.S. Pat. No. 7,856,522 which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

As the use of mobile devices and removable media increases, there is a need to improve the performance of memory and data management using these devices. A memory source that has been widely adopted for mobile devices is flash memory. Flash memory utilizes a multi-level cell structure to store data using a level of electrical charge placed on the gate of each cell. Flash memory presently is primarily implemented as a NOR type device or a NAND type device. A NAND type flash memory uses tunnel injection and release for writing and erasing of data for each cell. NAND flash is preferred for many mobile devices and applications as NAND flash has faster access and write times and lower per-bit cost than NOR type flash, and has a longer life than NOR flash devices. NAND type flash only allows sequential access to data, however, which makes it useful for devices such as memory cards and portable devices, but not as useful for multiple application or multi-user memory.

As applications such as increasingly complex and powerful multimedia-based applications are being deployed on these mobile and embedded devices, it also becomes necessary to improve the way that complex data is managed, as well as the way in which standardization and platform independence is achieved. One approach often used to improve data management is to utilize a database management system (DBMS). A DBMS typically is used to manage the storage and retrieval of data from at least one database. Each database can have associated therewith a relational model or schema that defines the organization of that data in the respective database. The DBMS can be used to optimize data structures for volatile or persistent storage devices, and can further allow authorized and authenticated users to query each database managed thereby. A DBMS also can ensure data integrity by managing transactions for multiple concurrent users. Present DBMS technologies, however, are generally designed to run on top of disk-based non-volatile storage media, and due to the nature of these disk-based storage mechanisms the storage methods inherently have inefficiencies when running on NAND-type flash memory based nonvolatile storage.

One reason for this inefficiency is the special characteristic of NAND type flash-memory wherein erase operations, which are relatively slow, must occur on a block or collection of pages prior to the in-place updating of data on one of those pages. This creates a significant overhead for I/O operations. Such characteristics thus do not allow for efficient use of a DBMS or other data management system on a device such as a NAND-type flash memory device.

BRIEF SUMMARY OF THE INVENTION

Systems and methods in accordance with various embodiments of the present invention overcome deficiencies in existing data management approaches by utilizing a virtual page map between a flash memory device and an access component of a mobile device.

In one embodiment, a flash memory component is used to store data on the device. If the mobile device uses a database management system, this data may be stored in the flash memory component in a physical page. The mobile device also includes a cache memory component that allows a copy of at least a portion of the data in the flash memory to be temporarily stored in main memory on the mobile device. A virtual page map component or layer then is used to map the logical page numbers of the logical pages in the cache memory component to physical page numbers for physical pages in the flash memory component. Data updates and processes can be executed against the data in logical pages in cache memory, reducing the number of reads and writes to flash memory.

Once a data transaction or other data update is accomplished for the logical page, the updated data is written to a physical page in the flash memory component. The virtual page map can determine if a physical page for the updates exists, or if a new page needs to be allocated. Once the data is committed to the allocated page in flash memory, the page numbers can be remapped as appropriate. Once the data is committed to a physical page, the page map also can release the logical page as appropriate. The logical pages in cache also can be refreshed as needed following a crash, failure, etc.

The flash memory component can be any appropriate flash memory component known or used for mobile devices, such as NAND-type flash memory that can be removable or permanent within the mobile device. Access to the data can be provided for any appropriate reason, such as for applications executing on the mobile device or for authorized and authenticated external devices communicating with the mobile device. The virtual page map can include a bitmap structure divided into segments, each of which can be flushed when appropriate new storage is allocated.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments can overcome the aforementioned and other deficiencies in existing data management technology by providing a reliable storage system for DBMS that can run on memory devices such as NAND type flash memory. Such an approach can utilize minimum I/O overhead and provide maximum data durability. Minimal I/O overhead is obtained in various embodiments by utilizing a virtual page map layer between the underlying flash memory, or database file, and a page access layer, or pager component. Such an approach can be used with a mobile database, for example, such as a mobile database supporting SQL and other relational query features for mobile phones.

Figure 1:
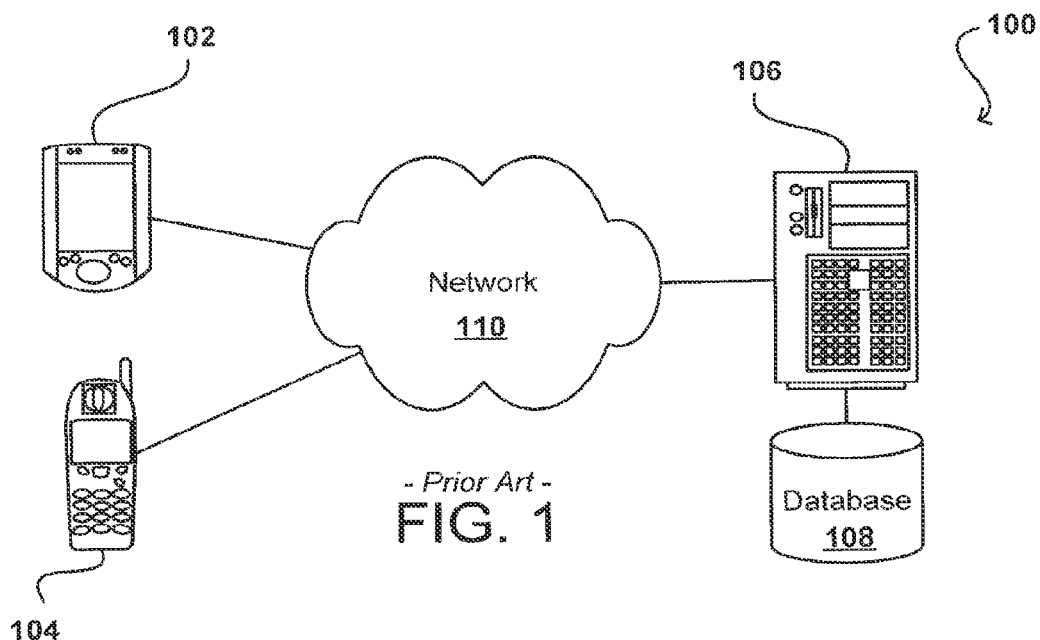
FIG. 1 illustrates an exemplary network configuration of the prior art that can be used with various embodiments of the present invention.

FIG. 1 shows a typical configuration 100 of the prior art wherein mobile devices 102, 104 can communicate with each other and/or with a device such as an application server 106 in communication with persistent storage 108 via at least one network 110, such as a cellular network or Internet connection. In standard approaches, the mobile devices maintain journals or logs of changes to data, in order to address problems such as loss of connection or data latency issues. The use of a virtual page map in accordance with various embodiments instead avoids the need for standard journaling and logging, as the virtual page map can record changes to pages of the DBMS, and can prevent any overwriting or other loss of data. Such an approach reduces the write and erase counts on the flash memory, thus increasing performance. Since a database management system (DBMS) utilizes logical page numbers to address and access data pages, these logical page numbers can be coupled with the physical page numbers, and their relationship maintained in a virtual page map. When changes to a certain page occur, the virtual page map can allocate an available page from the physical pages, and can store the updated information in the allocated page. The newly allocated page number then can be mapped with the logical page number of the original page, maintaining the modified representation of the page while effectively preventing any physical in-place updates.

The virtual page map maintains a copy of the map in nonvolatile storage. Refreshing the in-memory page using the copy enables reliable recovery when unexpected failure occurs. The virtual page map can utilize a bitmap structure to allocate and map pages, and can dynamically increment as new storage is made available. The virtual page also can be divided into segments, and only flushes a segment when the changed page is located, thereby minimizing any unnecessary I/O. Further, the use of a virtual page map can eliminate the use of data journaling or logging in order to support data recovery. The use of a virtual page map also can defer data modification in a transaction until transaction commit time, effectively preventing small writes that often lead to hindered performance in NAND type flash memory. An exemplary device utilizing a virtual page map in accordance with one embodiment demonstrated average improvement of more than 60% compared to DBMS using conventional storage systems.

The use of a virtual page map is particularly suitable to NAND-type flash memory. Virtual page maps not only increase performance by reducing the number of write I/Os and access requests, as discussed above, but also are very reliable for database transactions. Whenever an abrupt stop or crash of the database system occurs, the ongoing transactions can be safely recovered by logging the changes of the virtual page map in a hidden journal file under the storage layer.

In order for a device to be flash-aware or "flash-friendly" in accordance with various embodiments, the interaction with the underlying flash storage is minimized while the necessary data characteristics, such as ACID (Atomicity, Consistency, Isolation, Durability) characteristics, are maintained. In one embodiment writes to the storage are minimized or deferred using "shadow paging," wherein a page map table is retained in main memory and in-place updates are effectively prevented by mapping the logical and physical pages. Frequent writes can be buffered and written to the storage only at the end of the transactional stage. Such an approach can reduce both the number of small writes and the data being written to disk by doing much of the operations in the main memory, and accessing the underlying storage only when necessary.

In one embodiment, the virtual page map approach is designed to seamlessly integrate into an ACID-compliant database management system, such as SQLite, My SQL, or Oracle Database. Such systems can provide and/or implement an embeddable database engine. An embedded DMBS can be implemented in multiple layers determining the format of the respective database files. In one example, these layers include a Pager layer, a B-Tree layer, and a Schema layer. The Pager layer in this example is the "bottom" layer, which includes pages of data numbered sequentially beginning with 1 (with 0 being used to indicate "no page" in the B-Tree and Schema layers). The Pager layer implements transactions using a journal file that records the state of the database such that the journal file can be used to restore the database to its previous state if necessary. The B-Tree layer sits on top of the Pager layer and implements one or more separate b-trees in the same disk file. The Schema layer implements a database such as a SQL database on top of the b-trees and implements both table and index data storage abstractions.

Figure 2:
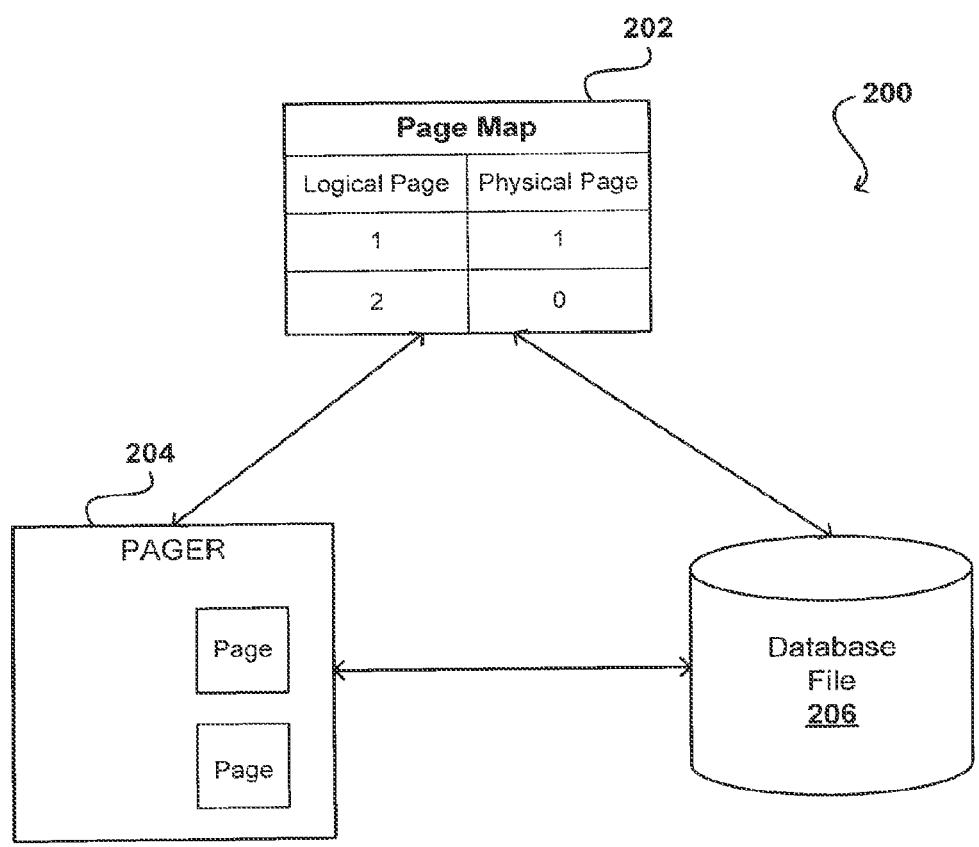
FIG. 2 illustrates a configuration utilizing a page map in accordance with one embodiment of the present invention.

When operating an embedded DBMS with a page map approach, a page can be allocated by first checking to see whether the page is in the cache. If the page exists, the page can be immediately returned as in a typical cache operation. If the page is not found, the page is in the database file or corresponds to a new page ID that is not inside the database and should be allocated. FIG. 2 illustrates an approach 200 for allocating pages and determining page allocations in accordance with one embodiment. When a physical page for a logical page in the page map 202 is at value 0, the logical page is not yet allocated. If the physical page contains a page number greater than 0, the page is allocated and contains valid data. If the physical page corresponds to a value such as 0xFFFF, for example, the logical page has been allocated but does not contain valid data, and therefore can be considered a 'garbage' page and subject to reuse in next allocation. If a request is received by the pager 204, and there is no hit for the page in cache, the pager can check the database file 206 for the page and read the page from the database. The pager then can update the page map table 202 with the appropriate logical and physical page data, and the page map can be synchronized with the database.

When a page inside the database file is to be read, the Pager can first determine whether the requested page is inside the database. If it is a valid page, the pager consults the page map to locate the physical address for the page containing the most current data. Then, the Pager reads the physical page ID location from database file and loads the page as page 1.

When changes occur in a page, a new page can be allocated (internally) by the pager indicating where the updated data should be stored. The new data then is stored into the database file as a new physical location for the logical page. The page map modifies the physical page ID of the logical page according to the newly allocated page ID. For example, the physical page value for logical page '1' can update from '1' to '2'.

When updates occur more than twice to a logical page, the intermediate page is marked as "garbage" since the data for that page is outdated. The physical location of the page is marked as '0xFFFF' to designate the page as available for the next internal allocation of pages for reuse.

Figure 3A:
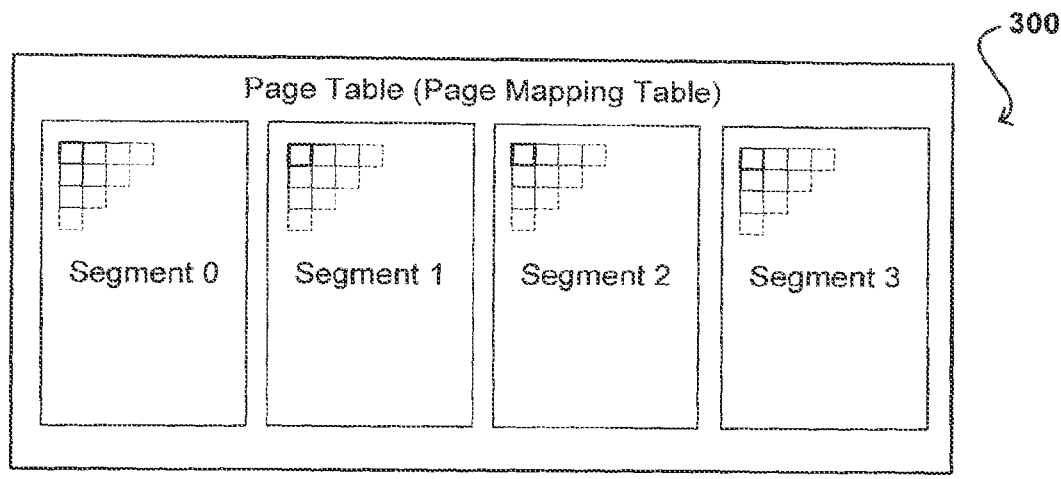
FIGS. 3($a$)-($c$) illustrate aspects of a page table that can be used in accordance with one embodiment of the present invention.
Figure 3B:
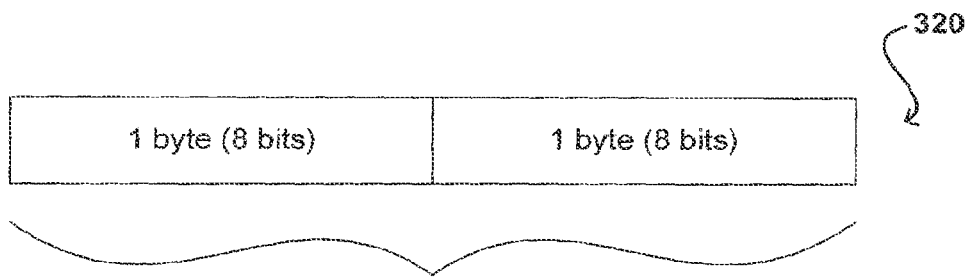

The Page Map table itself 300, such as is illustrated in FIG. 3(a), is a structure initialized in memory that can act as a 'mapping table' between a logical page ID and a physical page ID. Such a table can keep track of both current and modified data such that changes do not get propagated to the secondary storage immediately, but can be kept in the memory until a transaction commit is completed and synchronization is carried out. As shown in the figure, the table can contain a collection of 'segments' that include bitmaps for each page ID usable in the database. Each page can be a data chunk used in reading and writing to the secondary storage by the pager. Inside each segment in one embodiment lies a bitmap that is 2 bytes, containing a physical page ID (up to 16 bits of addressable range for the page ID) to which this logical page ID is mapped. This is illustrated in the arrangement 320 of FIG. 3(b).

Figure 3C:
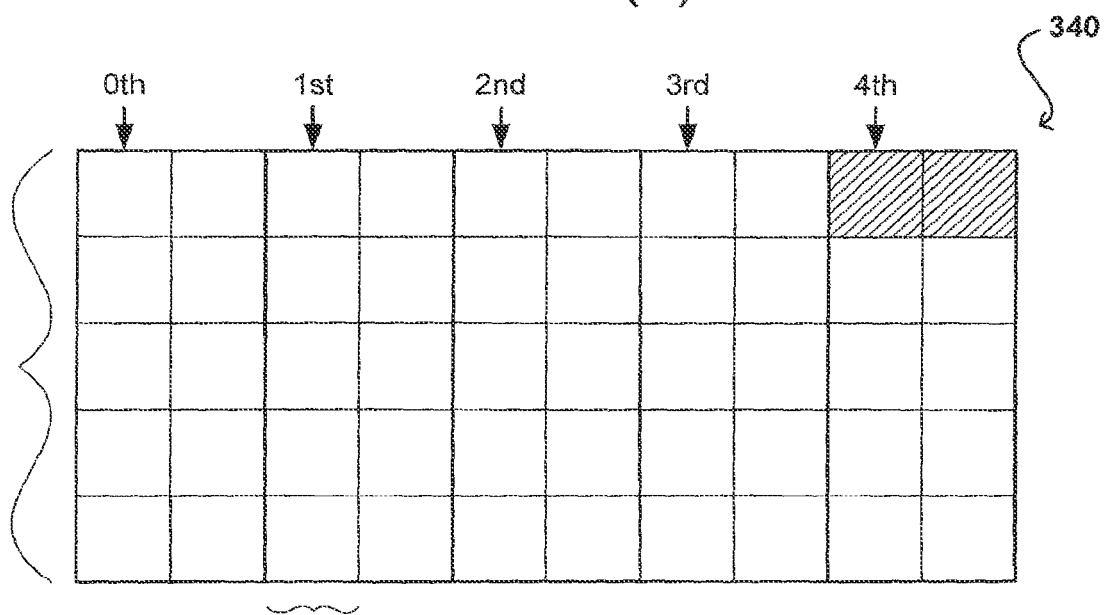

The logical page ID can be calculated using the absolute position where a bitmap in a segment is located. Thus, if a pager wishes to access page N (logical ID), the pager can look up the N*2 byte offset of its page map (segments are in sequential order, so it can calculate the relative offset inside the segment x where x is N*bytes), and read the physical page ID for the flash storage. FIG. 3(c) illustrates a Page Table Segment 340 wherein the shaded single 2 byte bitmap corresponds to a read address of a single (logical) page. The number "4th" corresponds to the logical page ID, which is sorted in sequential order. The total size of the bitmap thus depends on the total size of pages used.

A two stage approach can be used when implementing a circular log. First, appropriate data structures (e.g., page table, segments, and garbage stack) and handling functions can be developed. The Pager and B-Tree portions of the DBMS library can be modified to reflect the page table behavior. The modifications can primarily be accomplished inside the sources in the pager, and functions involved in pager open (initializing stage), getting a page, writing a page, writing dirty pages into a database file, synchronizing pages, and rollback and/or recovery operations of the pager.

When the Pager opens, a shadow pager library will initialize the page map structure mentioned and read the page map file (e.g., the synchronized page map table in flash storage), then populate the file into memory. The pager will then be ready to proceed with database operations.

Figure 4:
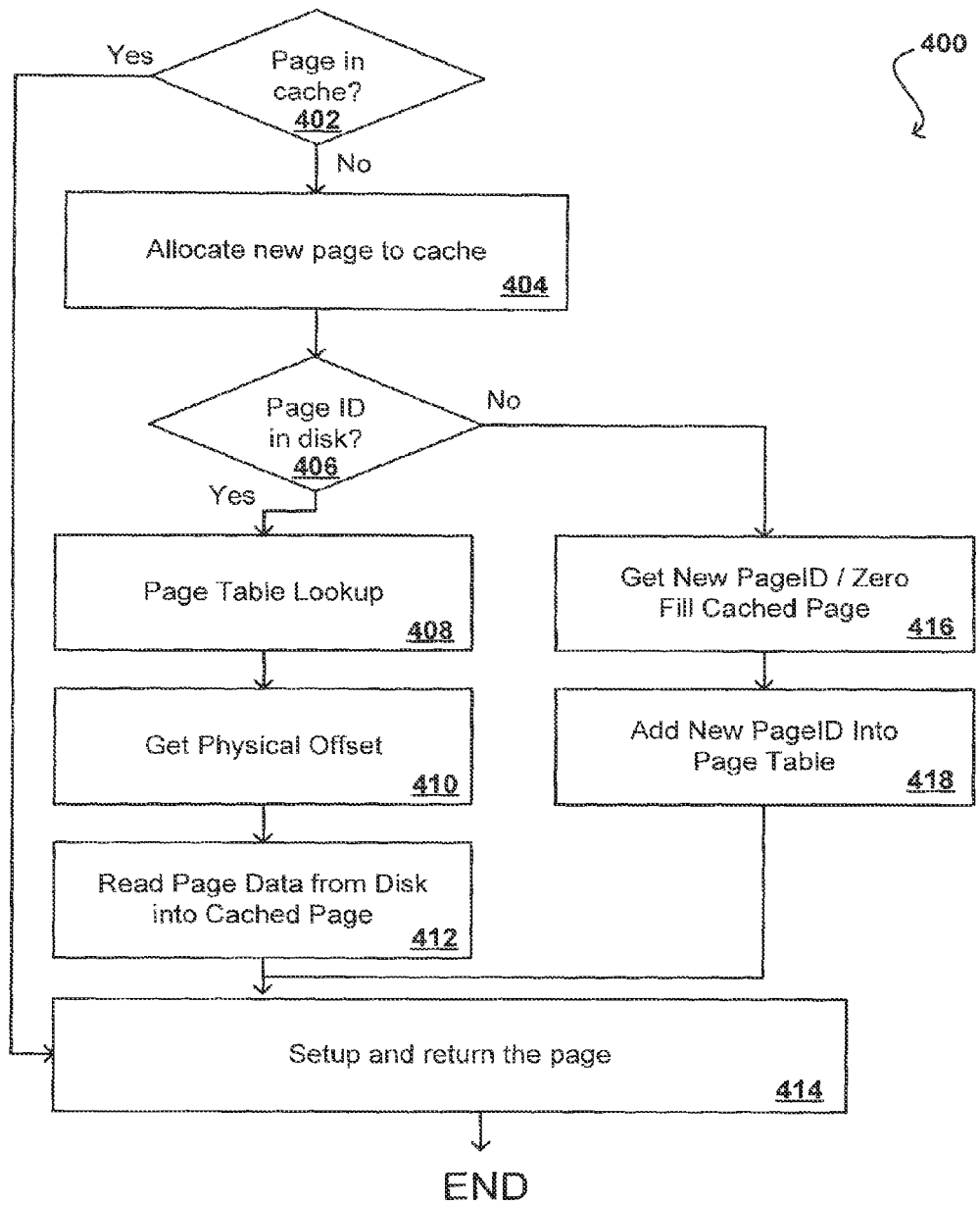
FIG. 4 illustrates steps of a process that can be used in accordance with one embodiment of the present invention.

When getting a page, a determination is made as to whether the page is in cache 402, such as is illustrated in the exemplary flowchart 400 of FIG. 4. If so, the page is setup and returned 414. If not, a new page is allocated to the cache 404 and a determination is made as to whether the page ID is stored on the disk 406. If so, a Page Table Lookup is performed 408 and the physical offset obtained 410 so that the page data can be read from disk into the cached page 412. If not, a new page ID can be obtained 416 and added into the Page Table 418 so the page can be setup and returned 414.

Figure 5:
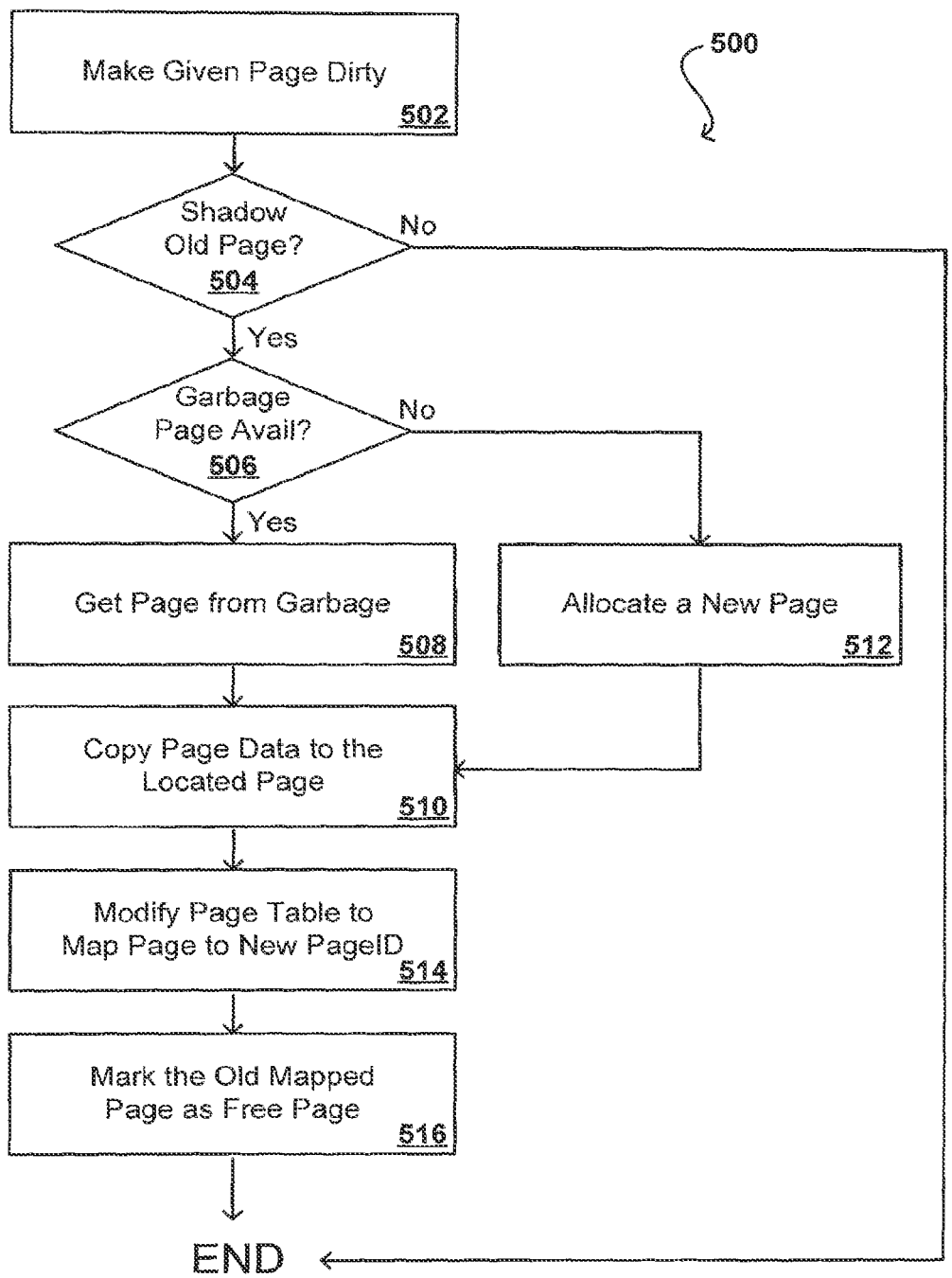
FIG. 5 illustrates steps of a process that can be used in accordance with one embodiment of the present invention.

When writing a page or doing a page data update, the physical address of the logical page ID is located and data written into it using a shadow pager logic process 500 such as is illustrated in FIG. 5. First, the given page is made "dirty" 502 and a determination is made as to whether the page type is set to a type such as "SHADOW_OLD_PAGE" 504. For a type "SHADOW_OLD_PAGE," a page received by the pager may be a valid page (e.g., resides inside the disk) or a newly allocated page that is not yet in the disk yet. The page can be marked as type "SHADOW_OLD_PAGE" if the page is from the range of valid (or "old") database file pages. If the type is not a type such as "SHADOW_OLD_PAGE", the page writing process for page data update ends. If the type instead is such a type, another determination is made as to whether there is a garbage page available 506. If a garbage page is available, that page is obtained from the "garbage" location 508 and the page data may optionally be copied to the located page 510. If no garbage page is available, a new page is allocated 512. The page table then can be modified to map the page to a new PageID, marking the segment in which this change occurred as "dirty" 514. The old mapped page also can be marked as a free page 516.

Figure 6:
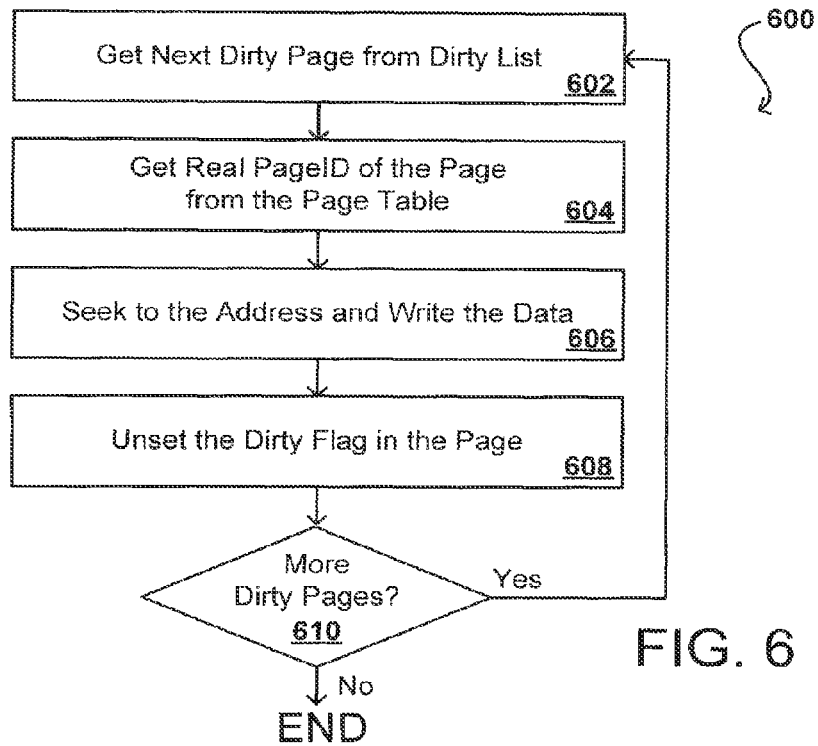
FIG. 6 illustrates steps of a process that can be used in accordance with one embodiment of the present invention.

Before synchronizing the page table, a commit process can write the page data into non-volatile storage, such as by using a process illustrated in the flowchart 600 of FIG. 6. In the process, the next dirty page is obtained from a dirty list 602, and the real page ID of the page is obtained from the page table 604. A seek then can be executed to the address and the data can be written 606. If the real page ID is a value such as 0xFFFF as discussed above, then this page was a garbage page so the data can be written to the logical ID instead. Garbage marking can occur just before writing the contents to be modified. The dirty flag in this page then can be unset 608. If there are more dirty pages 610, the process can continue at step 602 with the next dirty page.

Figure 7:
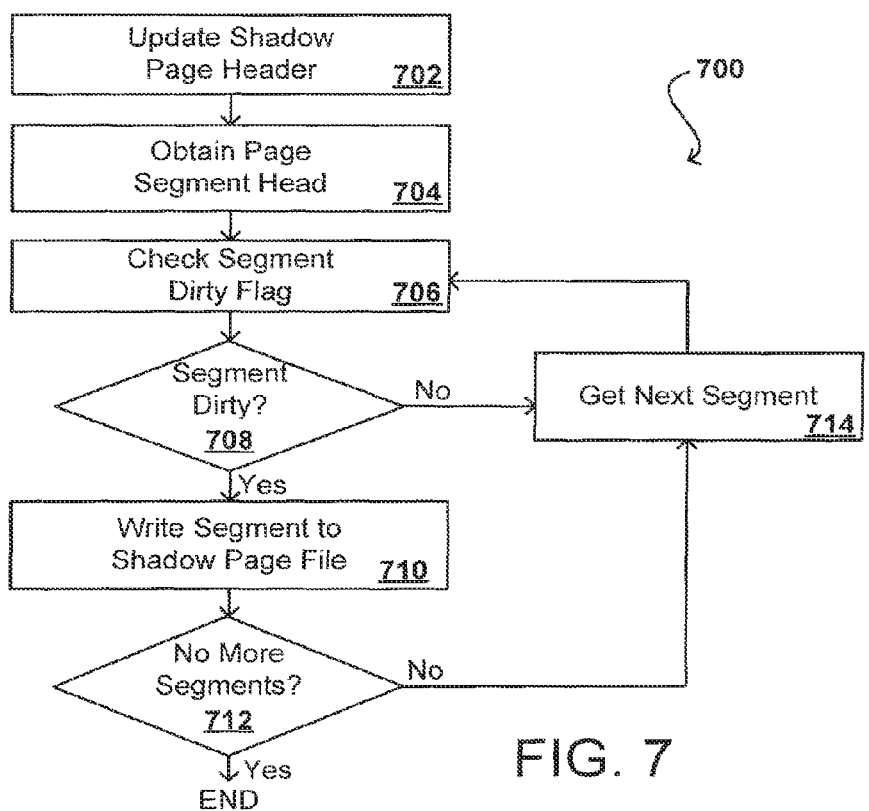
FIG. 7 illustrates steps of a process that can be used in accordance with one embodiment of the present invention.

After the data is written to disk, a "sync" table can be synchronized so that the changes are recorded permanently, using a process 700 such as is illustrated in FIG. 7. When synchronizing the page table, the shadow page file's header can be updated 702 and a page segment head obtained 704. A dirty flag for the segment can be checked 706, and a determination made as to whether the segment is dirty 708. If not dirty, the next segment can be obtained 714. If the segment is dirty, the segment is written to the shadow page file 710. If there are more segments 712, the next segment can be obtained 714 and the process can continue until all dirty segments are handled accordingly.

In some cases, the changes may need to be rolled back or recovered, such as in the case of a disk crash or system failure. In such a case, the page table can be reloaded into memory, such as by first clearing the page cache and page table, then reloading the page table.

Some embodiments restrict operation to single-user applications, in order to avoid concurrent access to the same database which can lead to significant performance hits on some devices. Other embodiments, however, provide for multiple concurrent users, applications, and/or access requests.

Exemplary Operating Environments, Components, and Technology

Figure 8:
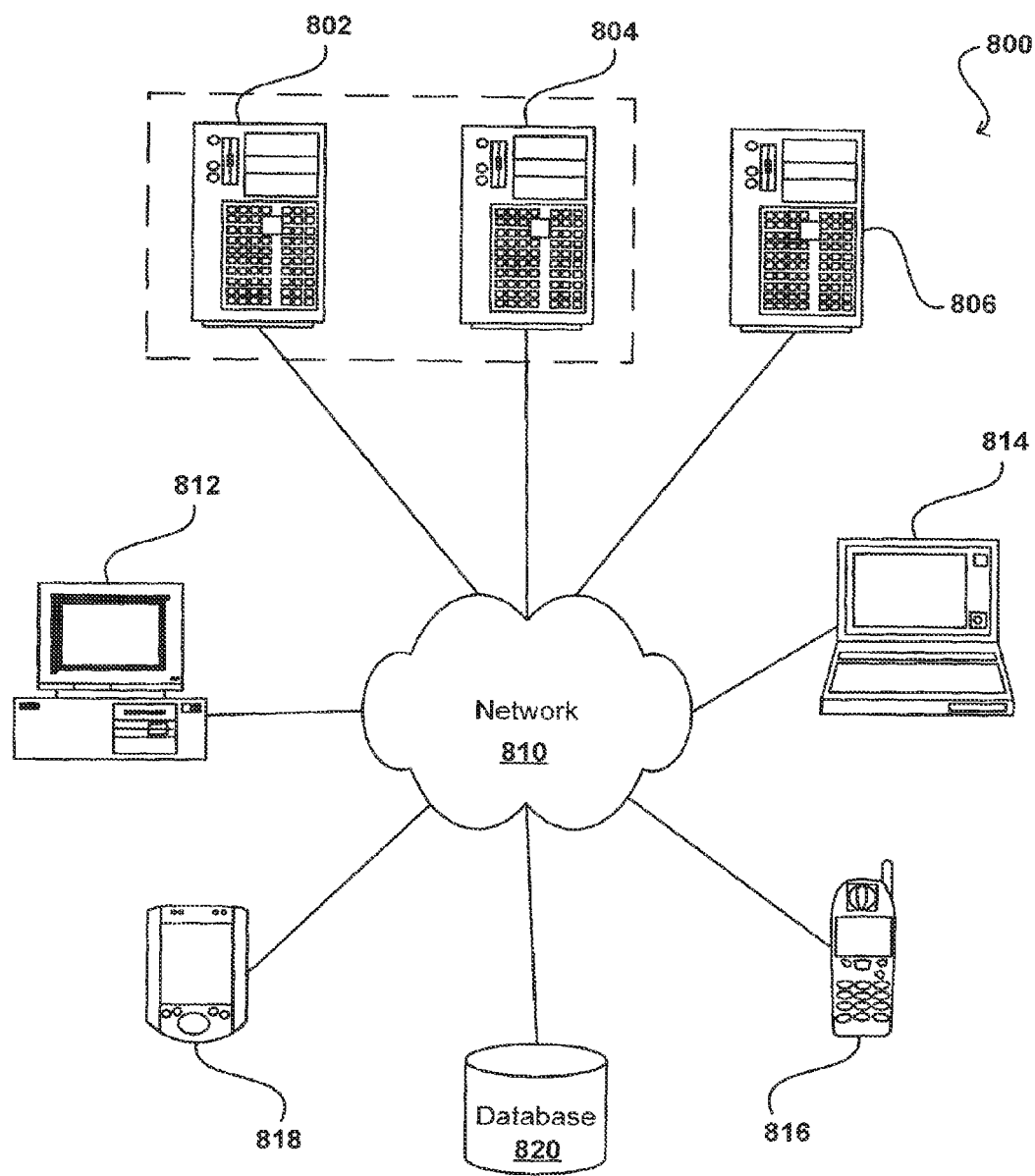
FIG. 8 illustrates components of a computer network that can be used in accordance with one embodiment of the present invention.

FIG. 8 is a block diagram illustrating components of an exemplary operating environment in which various embodiments of the present invention may be implemented. The system 800 can include one or more user computers, computing devices, or processing devices 812, 814, 816, 818, which can be used to operate a client, such as a dedicated application, web browser, etc. The user computers 812, 814, 816, 818 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 812, 814, 816, 818 may also have any of a variety of applications, including one or more development systems, database client and/or server applications, and Web browser applications. Alternatively, the user computers 812, 814, 816, 818 may be any other electronic device, such as a thin-client computer, Internet-enabled gaming system, and/or personal messaging device, capable of communicating via a network (e.g., the network 810 described below) and/or displaying and navigating Web pages or other types of electronic documents. Although the exemplary system 800 is shown with four user computers, any number of user computers may be supported.

In most embodiments, the system 800 includes some type of network 810. The network may can be any type of network familiar to those skilled in the art that can support data communications using any of a variety of commercially-available protocols, including without limitation TCP/IP, SNA, IPX, AppleTalk, and the like. Merely by way of example, the network 810 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 802, 804, 806 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 806) may be dedicated to running applications, such as a business application, a Web server, application server, etc. Such servers may be used to process requests from user computers 812, 814, 816, 818. The applications can also include any number of applications for controlling access to resources of the servers 802, 804, 806.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 812, 814, 816, 818. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 812, 814, 816, 818.

The system 800 may also include one or more databases 820. The database(s) 820 may reside in a variety of locations. By way of example, a database 820 may reside on a storage medium local to (and/or resident in) one or more of the computers 802, 804, 806, 812, 814, 816, 818. Alternatively, it may be remote from any or all of the computers 802, 804, 806, 812, 814, 816, 818, and/or in communication (e.g., via the network 810) with one or more of these. In a particular set of embodiments, the database 820 may reside in a storage-area network ("SAN") familiar to those skilled in the art. Similarly, any necessary files for performing the functions attributed to the computers 802, 804, 806, 812, 814, 816, 818 may be stored locally on the respective computer and/or remotely, as appropriate. In one set of embodiments, the database 820 may be a relational database, such as Oracle 10 g, that is adapted to store, update, and retrieve data in response to SQL-formatted commands.

Figure 9:
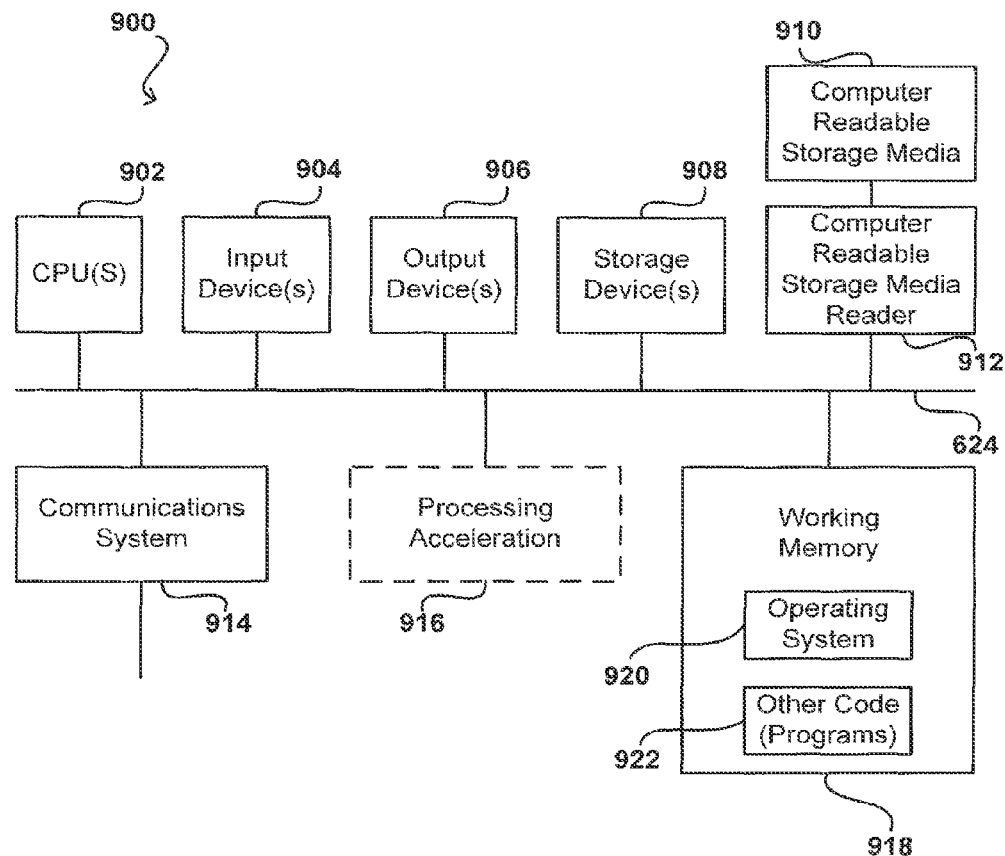
FIG. 9 illustrates components of a computerized device that can be used in accordance with one embodiment of the present invention.

FIG. 9 illustrates an exemplary computer system 900, in which various embodiments of the present invention may be implemented. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc.), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing, storing, transmitting, and retrieving computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for managing data on a mobile device, the system comprising:
    a flash memory component in communication with the mobile device and operable to store data;
    a cache memory component operable to store a copy of at least a portion of the data in temporary storage on the mobile device;
    a database management component on the mobile device and operable to manage data in pages included in a database;
    an access component operable to provide access to the data managed in the pages, wherein each of the pages include a logical page number, wherein the access component is further configured to access the cache memory component to determine if a requested page is stored in the cache memory component, and wherein if the requested page is not stored within the cache memory component, then the access component is configured to access the requested page from the database;
    a virtual page map component operable to maintain mappings of logical page numbers of the pages managed by the database management component with physical page numbers in the flash memory component, wherein updates to the data stored in the cache memory component are made using a logical page number to identify the logical page in the cache memory, and provide the physical page number to be used in updating the physical page stored on the flash memory component after updates to the corresponding logical page in the cache memory are complete; and
    a pager configured to, when a page is requested to be read, determine if the page requested to be read is inside the database, if the page requested to be read is inside the database, then the pager is configured to consult the virtual page map to locate a physical address for the page including data which is most recent, then, the pager is configured to read a physical page ID location from database and loads the page,
    wherein when changes occur in the page, a new page is internally allocated by the pager indicating where updated data is to be stored, and the new data is then stored in the database as a new physical location for the logical page, wherein the virtual page map is configured to modify the physical page ID of the logical page according to the newly allocated page ID;
    wherein when an update occurs more than twice to a logical page, an intermediate page is marked as garbage indicating that the data for the page is outdated, and the physical location of the page is marked as '0xFFFF' to designate that the page is available for the next internal allocation of pages for reuse.

2. The system according to claim 1, wherein the flash memory component is removable from the mobile device.

3. The system according to claim 1, wherein the virtual page map component is further operable to flush the data from the logical page in the cache memory component only after the updates are committed in the flash memory component.

4. The system according to claim 1, wherein the virtual page map component is operable to determine whether one of the physical page numbers are mapped to one of the logical page numbers for an update, and further operable to allocate a new physical page number.

5. The system according to claim 1, wherein the flash memory component is NAND-type flash memory.

6. The system according to claim 1, wherein the access component is operable to provide access to the data stored in the cache memory for at least one of applications executing on the mobile device and external devices in communication with the mobile device.

7. The system according to claim 1, wherein the virtual map component is further operable to allocate an available physical page when changes occur to a page in the cache memory component and store updated data in the allocated page.

8. The system according to claim 7, wherein the virtual map component is further operable to map the available logical page number to the allocated page.

9. The system according to claim 1, wherein the virtual map page utilizes a bitmap structure.

10. The system according to claim 1, wherein the virtual map page is divided into segments, and each segment is operable to be flushed when new storage for the data of that segment which is allocated.

11. The system according to claim 1, wherein the access component is further operable to update the virtual page map component with appropriate logical and physical page data.

12. The system according to claim 1, wherein the virtual page map is further operable to mark a logical page available for allocation after that logical page has been updated at least twice.

13. A method of managing data on a mobile device, comprising:
    storing data in physical pages in a flash memory component on the mobile device;
    storing a copy of at least a portion of the data in logical pages in a cache memory component on the mobile device;
    providing access to the data stored in the cache memory component and the data stored in the flash memory component using an access component, wherein the access component accessing the cache memory component to determine if a requested page is stored in the cache memory component, and wherein if the requested page is not stored within the cache memory component, then the access component is configured to access the requested page from the database;

accessing the cache memory component to determine if a requested page is stored in the cache memory component, wherein if the requested page is not stored within the cache memory component, then the access component is configured to access the requested page from a database;

maintaining mappings of logical page numbers for the logical pages in the cache memory component with physical page numbers for physical pages in the flash memory component in a virtual page map component;

updating the data is made using the logical page number to identify the logical page in cache memory, and the virtual page map is operable to provide the physical page number to be used in updating the physical page stored on the flash memory component after updates to the corresponding page in cache memory are complete;

when a page is requested to be read, determining if the page requested to be read is inside the database; and if the page requested to be read is inside the database, consulting the virtual page map to locate a physical address for the page including data which is most recent; and reading a physical page ID location from database and loading the page, wherein when changes occur in the page, a new page is internally allocated by the pager indicating where updated data is to be stored, and the new data is then stored in the database as a new physical location for the logical page, wherein the virtual page map is configured to modify the physical page ID of the logical page according to the newly allocated page ID;

wherein when an update occurs more than twice to a logical page, an intermediate page is marked as garbage indicating that the data for the page is outdated, and the physical location of the page is marked as '0xFFFF' to designate that the page is available for the next internal allocation of pages for reuse.

14. The method according to claim 13, further comprising managing the storing of data using a database management system.

15. The method according to claim 13, further comprising: flushing the data from the logical page in the cache memory component only after the updates are committed to a physical page in the flash memory component.

16. The method according to claim 13, further comprising: determining whether one of the physical page numbers are mapped to one of the logical page numbers for an update to the data.

17. The method according to claim 16, further comprising: allocating the one of the physical page numbers if the one of the physical page numbers is not mapped to the one of the logical page numbers for the update.

18. The method according to claim 13, further comprising: providing access to the data stored in the cache memory for at least one of applications executing on the mobile device and external devices in communication with the mobile device.

19. The method according to claim 13, further comprising: allocating an available physical page when changes occur to a logical page in the cache memory component and storing updated data in the allocated physical page.

20. A non-transitory computer-readable medium for managing data on a mobile device having sets of instructions stored thereon which, when executed by a computer, cause the computer to:

store data in physical pages in a flash memory component on the mobile device;

store a copy of at least a portion of the data in logical pages in a cache memory component on the mobile device;

provide access to the data stored in the cache memory component and the data stored in the flash memory component using an access component, wherein the access component accessing the cache memory component to determine if a requested page is stored in the cache memory component, and wherein if the requested page is not stored within the cache memory component, then the access component is configured to access the requested page from the database;

access the cache memory component to determine if a requested page is stored in the cache memory component, wherein if the requested page is not stored within the cache memory component, then the access component is configured to access the requested page from a database;

maintain mappings of logical page numbers for the logical pages in the cache memory component with physical page numbers for physical pages in the flash memory component in a virtual page map component;

update the data is made using the logical page number to identify the logical page in cache memory, and the virtual page map is operable to provide the physical page number to be used in updating the physical page stored on the flash memory component after updates to the corresponding page in cache memory are complete;

when a page is requested to be read, determining if the page requested to be read is inside the database; and if the page requested to be read is inside the database, consulting the virtual page map to locate a physical address for the page including data which is most recent; and reading a physical page ID location from database and loading the page, wherein when changes occur in the page, a new page is internally allocated by the pager indicating where updated data is to be stored, and the new data is then stored in the database as a new physical location for the logical page, wherein the virtual page map is configured to modify the physical page ID of the logical page according to the newly allocated page ID;

wherein when an update occurs more than twice to a logical page, an intermediate page is marked as garbage indicating that the data for the page is outdated, and the physical location of the page is marked as '0xFFFF' to designate that the page is available for the next internal allocation of pages for reuse.

* * * * *

UNITED STATES PATENT AND TRADEMARK OFFICE
CERTIFICATE OF CORRECTION

PATENT NO. : 8,495,282 B2
APPLICATION NO. : 12/945106
DATED : July 23, 2013
INVENTOR(S) : Lee et al.

Page 1 of 1

It is certified that error appears in the above-identified patent and that said Letters Patent is hereby corrected as shown below:

In the Specification

In column 4, line 31, delete "DMBS" and insert -- DBMS --, therefor.

In column 6, line 24, delete "PageID," andinsert -- PageID, --, therefor.

In column 8, line 21, delete "10 g," and insert -- 10g, --, therefor.

Signed and Sealed this
Twelfth Day of November, 2013

Teresa Stanek Rea
*Deputy Director of the United States Patent and Trademark Office*